US010075822B2

(12) United States Patent
Rajendran et al.

(10) Patent No.: US 10,075,822 B2
(45) Date of Patent: Sep. 11, 2018

(54) LOCATION-BASED SOCIAL COMMUNITY MANAGEMENT APPARATUS AND METHOD

(71) Applicant: Samsung Electronics Co., Ltd., Suwon-si, Gyeonggi-do (KR)

(72) Inventors: Balamurali Andiyakkal Rajendran, Bangalore (IN); Satnam Singh, Bangalore (IN); Gaurav Kumar Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 14/707,274

(22) Filed: May 8, 2015

(65) Prior Publication Data

US 2015/0326624 A1    Nov. 12, 2015

(30) Foreign Application Priority Data

May 8, 2014  (IN) .......................... 2300/CHE/2014
May 1, 2015  (KR) ........................ 10-2015-0062276

(51) Int. Cl.
*G06F 15/16*    (2006.01)
*H04W 4/08*    (2009.01)
(Continued)

(52) U.S. Cl.
CPC ............... *H04W 4/08* (2013.01); *H04L 51/32* (2013.01); *H04L 61/609* (2013.01);
(Continued)

(58) Field of Classification Search
CPC ........ H04W 4/08; H04W 4/021; H04L 51/32; H04L 51/20; H04L 61/609; H04L 65/403;
(Continued)

(56) References Cited

U.S. PATENT DOCUMENTS 9,083,767 B2 * 7/2015 Tseng
2008/0285527 A1 * 11/2008 Sammarco ............ H04L 67/306
370/338

(Continued)

FOREIGN PATENT DOCUMENTS

JP    2007-306409 A    11/2007
JP    2009-098967 A    5/2009
(Continued)

OTHER PUBLICATIONS

Spraffl; What's Spraffl all about?; http://www.spraffl.com/features/.
(Continued)

*Primary Examiner* — Viet D Vu
(74) *Attorney, Agent, or Firm* — Jefferson IP Law, LLP

(57) ABSTRACT

A social community management method includes: setting a group including a plurality of mobile devices, based on a location; determining common interest information shared by users of the plurality of mobile devices included in the group; creating a social community for communication of the users based on the determined common interest information; and transmitting information on the created social community to the plurality of mobile devices.

20 Claims, 16 Drawing Sheets

(51) Int. Cl.
  *H04L 29/06* (2006.01)
  *H04L 29/12* (2006.01)
  *H04L 29/08* (2006.01)
  *H04L 12/58* (2006.01)
  *H04W 4/021* (2018.01)

(52) U.S. Cl.
  CPC ............ *H04L 65/403* (2013.01); *H04L 67/10* (2013.01); *H04L 67/12* (2013.01); *H04L 67/18* (2013.01); *H04L 67/22* (2013.01); *H04W 4/021* (2013.01); *H04L 51/20* (2013.01); *H04L 67/306* (2013.01)

(58) Field of Classification Search
  CPC ......... H04L 67/10; H04L 67/12; H04L 67/18; H04L 67/22; H04L 67/306
  See application file for complete search history.

(56) References Cited

U.S. PATENT DOCUMENTS

| | | | |
|---|---|---|---|
| 2009/0215469 A1 | 8/2009 | Fisher et al. | |
| 2010/0036912 A1 | 2/2010 | Rao | |
| 2011/0142016 A1 | 6/2011 | Chatterjee | |
| 2013/0132481 A1 | 5/2013 | Lee et al. | |
| 2013/0137451 A1* | 5/2013 | Meredith | H04L 63/0236 455/456.1 |
| 2013/0137541 A1* | 5/2013 | Johnson | F16H 9/06 474/80 |
| 2013/0185323 A1 | 7/2013 | Moser | |
| 2013/0185368 A1* | 7/2013 | Nordstrom | H04L 51/32 709/206 |
| 2014/0013240 A1 | 1/2014 | Ganesh | |
| 2015/0261844 A1* | 9/2015 | Ramalho | H04L 67/306 707/749 |

FOREIGN PATENT DOCUMENTS

| | | |
|---|---|---|
| KR | 10-2012-0001175 A | 1/2012 |
| KR | 10-2012-0137626 A | 12/2012 |
| KR | 10-2013-0062436 A | 6/2013 |
| KR | 10-2014-0050537 A | 4/2014 |
| WO | 2013/006979 A1 | 1/2013 |

OTHER PUBLICATIONS

Lokast; What is Lokast?; http://www.lokast.com/what-is-lokast/; 2011.

Laine; User Interface Prototypes for Social Ad Hoc Networking, Master of Science Thesis; Tampere University of Technology; Jul. 11, 2012.

Wikipedia; Whisper (app); http://en.wikipedia.org/wiki/Whisper_(app); May 21, 2015.

* cited by examiner

LOCATION-BASED SOCIAL COMMUNITY MANAGEMENT APPARATUS AND METHOD

CROSS-REFERENCE TO RELATED APPLICATION

This application claims the benefit of Indian Patent Application No. 2300/CHE/2014, filed on May 8, 2014, in the Indian Patent Office and Korean Patent Application No. 10-2015-0062276, filed on May 1, 2015, in the Korean Intellectual Property Office, the disclosure of which is incorporated herein in its entirety by reference.

BACKGROUND

1. Field

One or more exemplary embodiments relate to social community management apparatuses and methods, and more particularly to location-based social community management apparatuses and methods based on user interest information.

2. Description of the Related Art

Social network applications are now ubiquitous. Social network applications connect users having different demographics to one another. In addition, social network applications have the common function of connecting users belonging to different cultures to one another. That is, social network applications enable communications between users anytime anywhere beyond the constraints of time and space.

In most cases, these user connections may be explicitly made. For example, when a user A connects to a user B, the user A initiates communication for connecting to the user B. Such a connection may be based on profile information that the users provide for others to see.

Most existing social network applications are static in nature. The term "static" may mean that users are allowed to share information with other users who are present in the social network application. For example, if a global event is going on but a user does not update his/her profile information, the fact that the user is interested in the global event may be missed.

In addition, the expression "social network applications are static in nature" may mean a static nature of a network topology. Therefore, reorganization of a once-established network is minimized and there is a limitation in coping with the expansion and change of the network.

Another aspect of the social network applications is the focus on the user without regard to the context in which the user is present. The term "context" may mean an environment to which the user belongs. Since the user is mobile, the context may vary with time. Hence, the varying context may be implicitly captured.

Location-based social network applications may solve these problems. However, people have some inhibition to communicate with strangers. Moreover, users would not like to reveal themselves to strangers in their first communication.

SUMMARY

One or more exemplary embodiments include location-based social community management apparatuses and methods for users who share common interest information with one another.

One or more exemplary embodiments include non-transitory computer-readable recording media having embodied thereon programs for executing the location-based social community management methods.

Additional aspects will be set forth in part in the description which follows and, in part, will be apparent from the description, or may be learned by practice of the presented exemplary embodiments.

According to one or more exemplary embodiments, a social community management method includes: setting a group including a plurality of mobile devices, based on a location; determining common interest information shared by users of the plurality of mobile devices included in the group; creating a social community for communication of the users based on the determined common interest information; and transmitting information on the created social community to the plurality of mobile devices.

The setting of the group may include setting a geographical area associated with locations of the plurality of mobile devices, and the geographical area is a virtual area where the plurality of mobile devices subjected to the creation of the social community are included.

The setting of the geographical area may include: selecting a wireless LAN service area where a same wireless access point is used; and determining whether a density of the plurality of mobile devices within the wireless LAN service area is equal to or greater than a threshold value.

The determining of the common interest information may include: gathering interest information of the users from a social network service (SNS) server or at least one of the plurality of mobile devices; and determining the common interest information based on the gathered information.

The gathering of the interest information may include gathering text data from the SNS server or at least one of the plurality of mobile devices and extracting keywords representing the interest information by applying topic modeling to the gathered text data, and the determining of the common interest information may include finding a common keyword by comparing the extracted keywords.

The generating of the social community may include generating online space where the users chat with one another or share files with one another.

The social community management method may further include removing the created social community when a density of the mobile devices within the geographical area is equal to or less than a threshold value.

The removing of the social community may include: setting a new geographical area by merging other geographical areas located within a predetermined distance from a perimeter of the geographic area; and removing the social community when a density of the mobile devices located within the newly set geographical area is less than the threshold value.

The social community management method may further include, when any one of the plurality of mobile devices deviates from the geographical area, transmitting the information on the created social community to the mobile devices other than the mobile device that deviates from the geographical area.

According to one or more exemplary embodiments, a social community management apparatus includes: a storage configured to store data about a group including a plurality of mobile devices based on a location; a controller configured to set the group, determine common interest information shared by users of the plurality of mobile devices located within the set group, and create a social community for communication of the users based on the determined common interest information; and a communication interface configured to transmit information on the created social community to the plurality of mobile devices.

The controller may set a geographical area associated with locations of the plurality of mobile devices, the storage may store data about the geographical area, and the geographical area may be a virtual area where the plurality of mobile devices subjected to the creation of the social community are included.

The controller may select a wireless LAN service area where a same wireless access point is used, and determine whether a density of the plurality of mobile devices within the wireless LAN service area is equal to or greater than a threshold value.

The communication interface may gather interest information of the users from a social network service (SNS) server or at least one of the plurality of mobile devices; and the controller may determine the common interest information based on the gathered information.

The communication interface may gather text data from the SNS server or at least one of the plurality of mobile devices, and the controller may extract keywords representing the interest information by applying topic modeling to the gathered text data, and find a common keyword by comparing the extracted keywords.

The controller may generate online space where the users chat with one another or share files with one another.

The controller may remove the created social community when a density of the mobile devices located within the geographical area is equal to or less than a threshold value.

The controller may set a new geographical area by merging other geographical areas located within a predetermined distance from a perimeter of the geographic area, and remove the social community when a density of the mobile devices located within the newly set geographical area is less than the threshold value.

When any one of the plurality of mobile devices deviates from the geographical area, the controller may transmit the information on the created social community to the mobile devices other than the mobile device that deviates from the geographical area.

According to one or more exemplary embodiments, a method of using a social community includes: transmitting location information of a first mobile device; receiving information on a social community created based on common interest information shared by a user of the first mobile device and users of a plurality of mobile devices including a second mobile device within a geographical area set based on the location information; displaying information on the social community on the first mobile device; and communicating with the second mobile device by using the received information on the social community.

According to one or more exemplary embodiments, a device includes: a communication interface configured to transmit location information of a first mobile device to a server and receive information on a social community from the server; a display configured to display the information on the social community on the first mobile device; and a controller, wherein the social community is created based on common interest information shared by a user of the first mobile device and users of a plurality of mobile devices including a second mobile device within a geographical area set based on the location information, and the controller controls the communication interface to communicate with the second mobile device by using the received information on the social community.

According to one or more exemplary embodiments, there is provided a non-transitory computer-readable recording medium having embodied thereon a program for executing the method described above.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
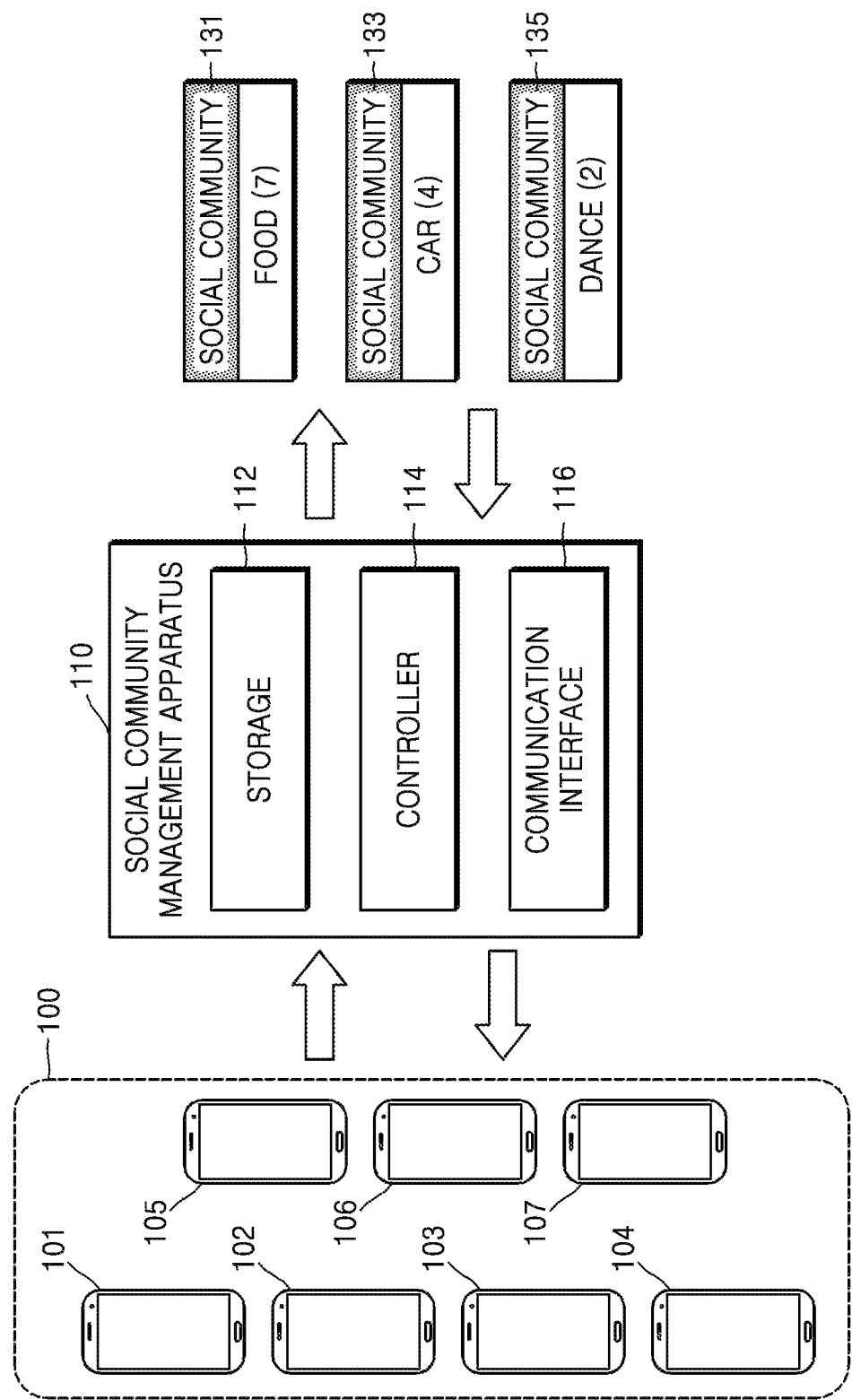
FIG. 1 is a block diagram of a social community management apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

The advantages and features of the inventive concept and methods of achieving the advantages and features will be described more fully with reference to the accompanying drawings, in which exemplary embodiments of the inventive concept are shown. The inventive concept may, however, be embodied in many different forms and should not be construed as being limited to the embodiments set forth herein; rather these embodiments are provided so that this disclosure will be thorough and complete, and will fully convey the concept of the inventive concept to one of ordinary skill in the art. The terms used in this specification are those general terms currently widely used in the art in consideration of functions in regard to the inventive concept, but the terms may vary according to the intention of those of ordinary skill in the art, precedents, or new technology in the art. Also, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

Throughout the specification, it will also be understood that when a component "includes" an element, unless there is another opposite description thereto, it should be understood that the component does not exclude another element but may further include another element.

Most users have some time to enjoy a social network service at a location such as a shopping mall, an airport, a terminal, and a bus stop. The social network used at such a location may anonymize the user so as to eliminate a risk of revealing user identity, and may be provided to only selected persons.

One or more exemplary embodiments may provide location-based social community management apparatuses and methods based on user interest information. The social community may mean online space to allow interaction between users belonging to a predetermined group. The group is composed of a set of users. The user is free to enter or exit from the group, and the group may be created, merged, and removed based on a location of the user and interest information. Such a group may be referred to as an elastic group. Hereinafter, the term "social community" used herein means an elastic group created based on common interest. Therefore, the social community may mean online space where users perform communication such as chatting, file sharing, posting, photograph sharing, games, and messaging, but is not limited thereto.

People may socialize or communicate for the first time when there are common points to share. If there is no common points known to people, it is difficult to start a conversation. In social network applications, the profile information of the users plays a role of these "common points". However, as described above, in the social network applications, targets to communicate with and targets to share status or information of the users may be statically determined. That is, the user may chat or share status of the user with only the preset persons. For example, there are no applications which can create an ad-hoc network in a waiting lounge of an airport or a pub where people can start conversing with strangers.

One of the "common points", which is the link of the communication, may include topics of interest information shared by people. The topics may mean keywords representing the interest information. The common points may be what he or she likes, what conversation topics they follow with others, where they go often, and the like. Since they share the interest information, even strangers may be grouped and an opportunity to communicate between them may be given.

FIG. 1 is a block diagram of a social community management apparatus 110 according to an exemplary embodiment.

The social community management apparatus 110 may include a storage 112, a controller 114, and a communication interface 116.

The storage 112 may be a volatile memory, a non-volatile memory, an internal memory, an external memory, or any combinations thereof. For example, the storage 112 may be non-volatile storage such as non-volatile random access memory (NVRAM), a flash memory, and a disk storage device, or may be volatile storage such as static random access memory (SRAM).

The controller 114 may be an application specific integrated circuit (ASIC), an embedded processor, a microprocessor, a hardware control logic, a hardware finite state machine (FSM), a digital signal processor (DSP), or any combinations thereof.

The communication interface 116 may enable communication with the outside. The communication interface 116 may access an external server or source and transmit and receive necessary data and may access the outside via various communication paths. The communication paths may represent various networks and network topologies. For example, the communication paths may include wireless communication, wired communication, optics, ultrasonic waves, or any combinations thereof. Examples of the wireless communication may include satellite communication, mobile communication, Bluetooth, infrared data association standard (IrDA), wireless fidelity (WiFi), and worldwide interoperability for microwave access (WiMAX). Examples of the wired communication may include Ethernet, digital subscriber line (DSL), fiber to the home (FTTH), and plain old telephone service (POTS). In addition, the communication paths may include personal area network (PAN), local area network (LAN), metropolitan area network (MAN), wide area network (WAN), or any combinations thereof.

Mobile devices 101 to 107 illustrated in FIG. 1 are exemplary and may include any types of devices. For example, the mobile devices 101 to 107 may include a mobile computer, a wearable device, a smartphone, a personal digital assistant (PDA)/an enterprise digital assistant (EDA), a tablet computer, and a portable game machine.

The controller 114 may determine a group 100 composed of the plurality of mobile devices 101 to 107 subjected to creation of a social community. For example, the controller 114 may determine the plurality of mobile devices 101 to 107, which are present within a wireless LAN service area where the same access point (AP) is used, as the group 100 subjected to creation of the social community, but the exemplary embodiment is not limited thereto. That is, the exemplary embodiment is not limited to the number of the mobile devices within the group 100 or the communication scheme between the mobile devices.

According to the exemplary embodiment, the controller 114 may determine mobile devices, whose densities are equal to or greater than a predetermined threshold value, as the group 100, and may remove the group 100 when the densities of the mobile devices included in the group 100 are less than the predetermined value.

The controller 114 may determine common interest information of users of the plurality of mobile devices 101 to 107 included in the group 100. In addition, the controller 114 may create social communities 131, 133, and 135 based on the common interest information. The social community 131 is a community that includes the mobile devices 101, 102, 103, 104, 105, 106, and 107 and focuses on food (7). The social community 133 is a community that includes the mobile devices 101, 103, 105, and 107 and focuses on car (4). The social community 135 is a community that includes the mobile devices 102 and 104 and focuses on dance (2). The social communities 131, 133, and 135 mean online spaces that allow chatting in the social communities by using own mobile devices or exchanging image, video, or music files.

The controller 114 may generate an aggregated list of topics of common interest information by aggregating the topics of the common interest information of the users of the mobile devices 101, 102, 103, 104, 105, 106, and 107 existing in the group 100. The topics mean keywords representing the interest information. The controller 114 may use social data existing in the SNS server or use sentences or words read and written by the users of the mobile devices 101, 102, 103, 104, 105, 106, and 107 observed in real time, so as to create the social communities 131, 133, and 135.

In addition, the controller 114 may remove the created social communities 131, 133, and 135 or merge social communities of other groups.

The communication interface 116 may gather social data existing in the SNS server or use sentences or words read and written by the users of the mobile devices 101, 102, 103, 104, 105, 106, and 107, so as to create the social communities 131, 133, and 135.

The communication interface 116 may transmit social community information generated for creating the social communities 131, 133, and 135 to the mobile devices 101, 102, 103, 104, 105, 106, and 107.

The storage 112 may store information on the group 100. For example, the storage 112 may store information on the number of the mobile devices existing in the group 100 and IDs of the mobile devices existing in the group 100.

In addition, the storage 112 may include a database configured to store the interest information of the users of the mobile devices 101, 102, 103, 104, 105, 106, and 107. According to the exemplary embodiment, the storage 112 may store mapping information of the IDs or real names of the users and the interest information. According to the exemplary embodiment, the storage 112 may store mapping information of the IDs or real names of the users and the interest information. The interest information gathered by the communication interface 116 may be synchronized with the database of the storage 112.

Figure 2:
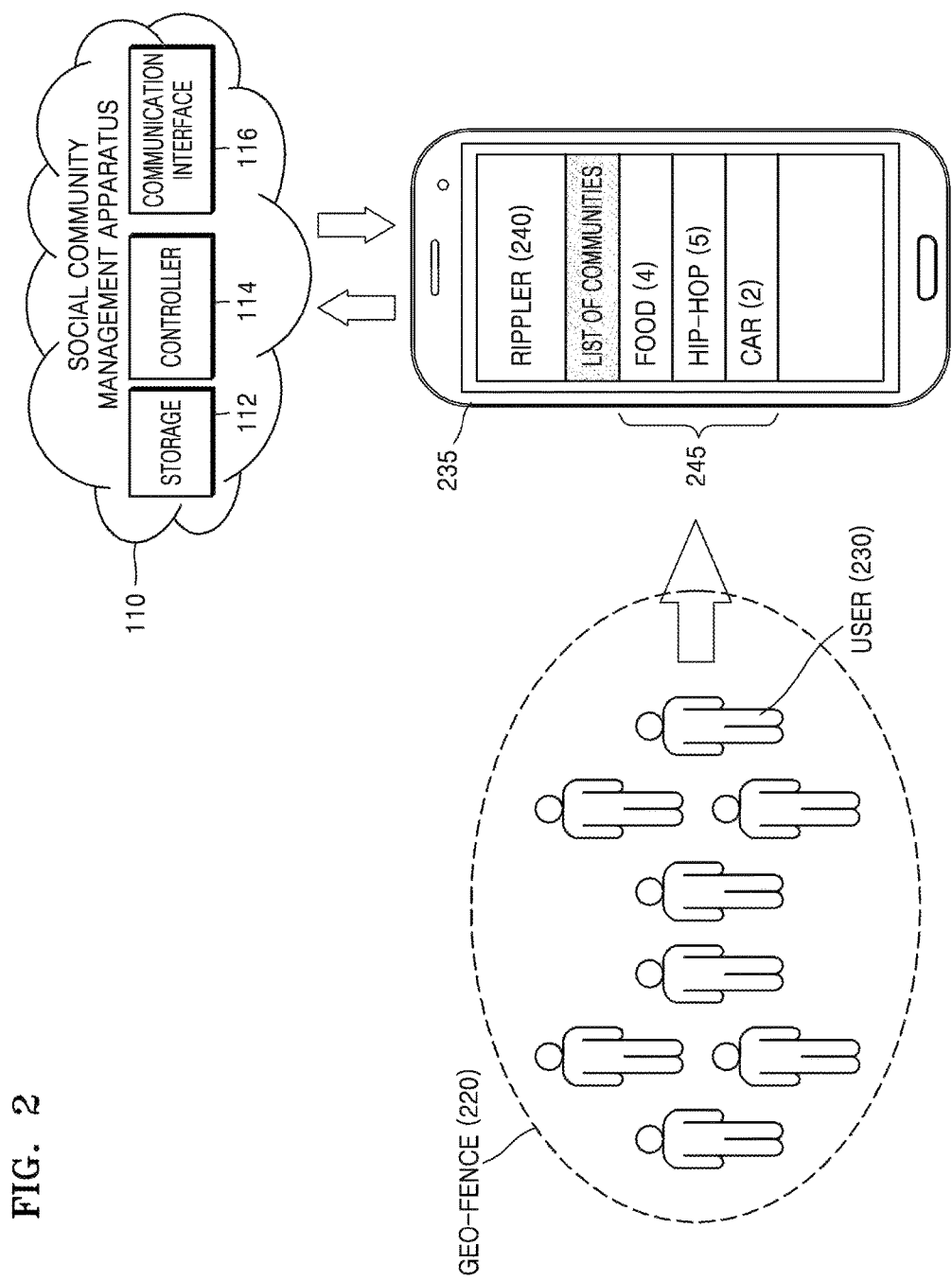
FIG. 2 is a schematic diagram of a social community management apparatus based on a virtual geographical area, according to an exemplary embodiment.

FIG. 2 is a schematic diagram of a social community management apparatus 110 based on a virtual geographical area, according to an exemplary embodiment.

A rippler 240 may include applications on a plurality of mobile devices 235 capable of using social communities. Although the rippler 240 is illustrated as being separate from the social community management apparatus 110, the rippler 240 may include the social community management apparatus 110 required for rippler applications.

Since a storage 112, a controller 114, and a communication interface 116 of the rippler 240 illustrated in FIG. 2 are substantially identical to the storage 112, the controller 114, and the communication interface 116 illustrated in FIG. 1, the descriptions provided with reference to FIG. 1 may also be applied to the social community management apparatus 110, that is, the rippler 240.

According to the exemplary embodiment, the social community management apparatus 110 may be a server apparatus including various types of centralized computing systems or distributed computing systems. The server apparatus may be a central server, a multimedia computer, a laptop computer, a desktop computer, grid computing resources, virtualized computer resources, cloud computing resources, peer-to-peer distributed computing systems, or any combinations thereof.

However, it will be understood by those skilled in the art that the rippler 240 may be implemented by using the connection between devices employing communication protocols such as Bluetooth or Wi-Fi, without server apparatuses.

The mobile device 235 may be any one of the mobile devices 101, 102, 103, 104, 105, 106, and 107 illustrated in FIG. 1. Hereinafter, users 230 may mean persons who hold the mobile devices 235. Indicating the specific user 230 may be indicating the specific mobile device 235. A density of the users 230 within a geo-fence 220 may be used as the same meaning as a density of the mobile devices 235 within the geo-fence 220.

In addition, although only one user 230 and only one mobile device 235 are illustrated for convenience of description, a plurality of users 230 and a plurality of mobile devices 235 used by the users 230 may exist within the geo-fence 220.

The controller 114 may determine a group 100 including the plurality of mobile devices 235 subjected to creation of a social community.

According to the exemplary embodiment, the controller 114 may set the geo-fence 220. The geo-fence 220 may mean a perimeter of geographical areas divided in a topology around the users 230 and may mean a virtual space where the plurality of mobile devices 235 are located. Hereinafter, the geo-fence 220 may mean a virtual area including the plurality of mobile devices 235 to which a predetermined social community service is to be provided. That is, the controller 114 may constitute the group 100 with the plurality of mobile devices within the geo-fence 220.

According to the exemplary embodiment, the geo-fence 220 may mean a wireless LAN service area where the same wireless AP is used. For example, the controller 114 may select a predetermined wireless LAN service area in an airport, a library, or a cafe, and determine the plurality of mobile devices 235, which are located within the selected wireless LAN service area, as the group 100 subjected to creation of the social community.

In order to set the geo-fence 220, the communication interface 116 may observe the locations of the mobile devices 235 of the users 230 and acquire location information. The communication interface 116 may use geographical information of the plurality of mobile devices 235, which is extracted from various high-tech location services such as global positioning system (GPS) or global system for mobile communications (GMS). The location information may include physical geographical locations of the mobile devices 235 and information regarding whether the mobile devices 235 are connected to a specific AP or are located within a specific hotspot.

The controller 114 may continuously observe the perimeter of the geo-fence 220 so as to check the mobile devices that deviate from the geo-fence 220.

The communication interface 116 may find out the users 230 whose ripplers 240 are active in the specific geo-fence 220 and who are interested in communication.

The controller 114 may set the geo-fence 220 based on the acquired location information. For example, the controller 114 may set an entire or partial region of a shopping mall, an airport, a terminal, a bus stop as the geo-fence 220 for managing the social community. The perimeter of the geo-fence 220 may be generated only when the user density is equal to or greater than a threshold value, based on the density of the users 230 (that is, the density of the mobile devices 235).

The storage 112 may store parameters that specify the perimeter of the geo-fence 220. In addition, the storage 112 may store information on the perimeter of the geo-fence 220 or data such as the location and radius thereof.

When the geo-fence 220 is set, the controller 114 may determine common interest information of the users 230 within the geo-fence 220 and create a social community for communications of the users 230, based on the determined common interest information. The controller 114 may use social data existing in the SNS server or use sentences or words read and written by the users of the mobile devices observed in the mobile devices in real time, so as to create the social communities 131, 133, and 135. A method by which the controller 114 gathers the interest information of the users and determines the common interest information will be described below with reference to FIGS. 5, 6, and 12.

Each of the created social communities may include all or part of the users 230 within the geo-fence 220. For example, a list of the social communities may include a community focusing on foods and a community focusing on cars.

The storage 112 may include a database configured to store the interest information of the users 230 capable of using the current rippler 240.

The communication interface 116 may gather the interest information of the users 230 capable of using the rippler 240. The communication interface 116 may store the gathered interest information in the database of the storage 112.

The rippler 240 may use various mining technologies to find out the interest information and activities of the users 230 and establish the database for the interest information of the users 230. The interest information of the users 230 may be profiled as a vector including interest information and context. When a user log is recorded in the rippler 240, an interest information vector may be transmitted to the social community management apparatus 110. The context may include accompanying words that co-occur with the topic of the interest information.

The controller 114 may generate a list 245 of the social communities. That is, the controller 114 may generate an aggregated list of topics of common interest information by aggregating the topics of the common interest information of the users 230 existing in the geo-fence 220. The topics may mean keywords representing the interest information. In addition, the controller 114 may remove the created social communities or merge social communities existing within a plurality of geo-fences 220.

The communication interface 116 may transmit the information on the created social communities to the mobile devices 235. The mobile devices 235 may display the received information on the social communities on screens.

The users 230 are allowed to see the list 245 of the social communities and the number of users belonging to the respective social communities. In the social communities, the users 230 may be anonymized. For example, in operation of creating the social communities, the controller 114 may encrypt the name of the user 230 into another name by using a predetermined mapping function.

The user 230 may communicate with other users existing within the geo-fence 220 directly or through the social community. For example, the users 230 may chat with one another or exchange image, video, or music files with one another within the social community by using their own mobile devices 235. That is, the users 230 may communicate with at least one of mobile devices existing within the geo-fence 220 by using their own mobile devices 235.

If the user 230 deviates from the perimeter of the geo-fence 220, the mobile device 235 of the user 230 is not the mobile device constituting the group 100 and the user 230 is not the member of the social community. Therefore, the already generated list of the social communities may not be displayed on the mobile device 235 of the user 230 who deviates from the geo-fence 220. That is, if any one of the mobile devices 235 deviates from the geo-fence 220, the controller 114 may control the communication interface 116 such that the information on the social communities is transmitted to the mobile devices other than the mobile device that deviates from the geo-fence 220.

The controller 114 may remove the social community, whose user density (that is, density of the mobile devices) is less than a threshold value. However, before removing the social community, the controller 114 may check whether another geo-fence 220 capable of being merged exists within a predetermined distance of the geo-fence 220 and try the merge of the geo-fence. The merge with another geo-fence will be described below with reference to FIGS. 11A and 11B.

Figure 3:
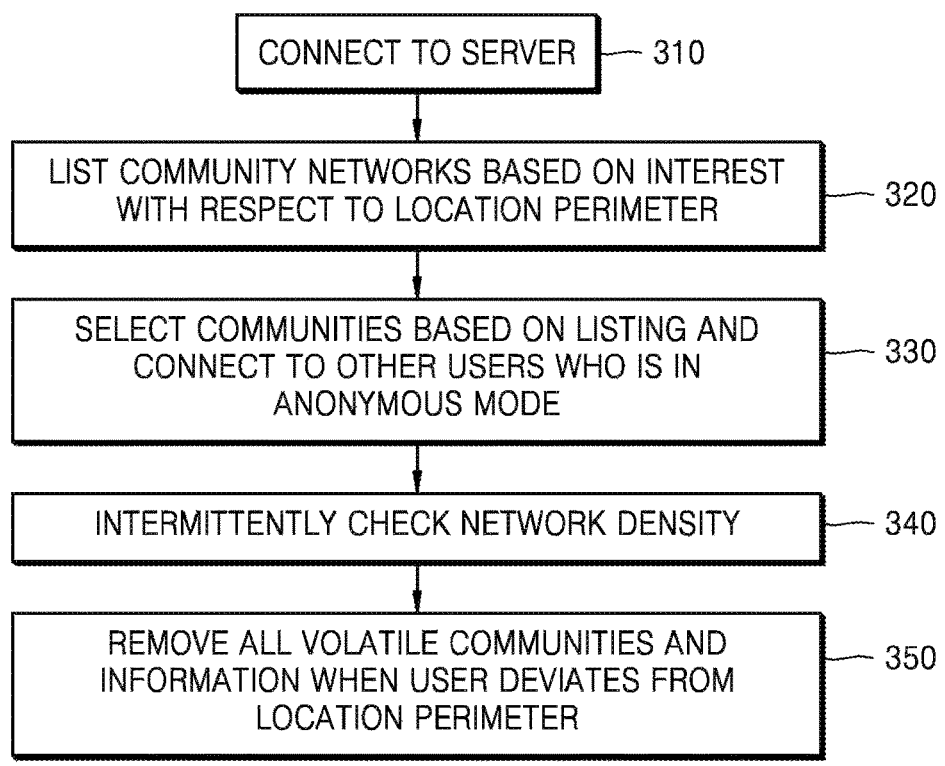
FIG. 3 is a flowchart of a social community management method, which is performed by a rippler, according to an exemplary embodiment.

FIG. 3 is a flowchart of a social community management method, which is performed by a social community management apparatus, according to an exemplary embodiment.

Specifically, FIG. 3 is a flowchart of a social community management method, which is performed by a rippler 240, according to an exemplary embodiment. Therefore, the descriptions provided with reference to FIG. 2 may be applied to the social community management method of FIG. 3.

In operation 310, the rippler 240 may connect an application to a server 110. According to the exemplary embodiment, a user may connect to the server 110 by executing the rippler 240 or refreshing a current state of the rippler 240.

In operation 320, the rippler 240 may set a geo-fence by determining a predetermined location perimeter and list social communities based on interest information of users existing within the geo-fence. The rippler 240 may receive location information of a plurality of mobile devices so as to set the geo-fence. The interest information may include static interest information and dynamic interest information. The interest information of the users may be merged or compared so as to generate an aggregated list of social communities.

In operation 330, the rippler 240 may select any one of the listed social communities and communicate with other users. Each of the users may be anonymized. According to the exemplary embodiment, the rippler 240 may create a non-volatile local community that does not disappear even when the user deviates from a predetermined location perimeter.

In operation 340, the rippler 240 may check the user density of the geo-fence. As described above, the rippler 240 may remove a social community within the geo-fence when the user density of the social community is less than a threshold value.

In operation 350, the rippler 240 may delete information of the user from the social community when the user deviates from the geo-fence. That is, the rippler 240 may delete details of the user existing in the social community and a user log from the server. The social community listed prior to the deviation from the geo-fence may no longer appear in the list of the social communities that is displayed on the mobile device of the user who deviates from the geo-fence.

Figure 4:
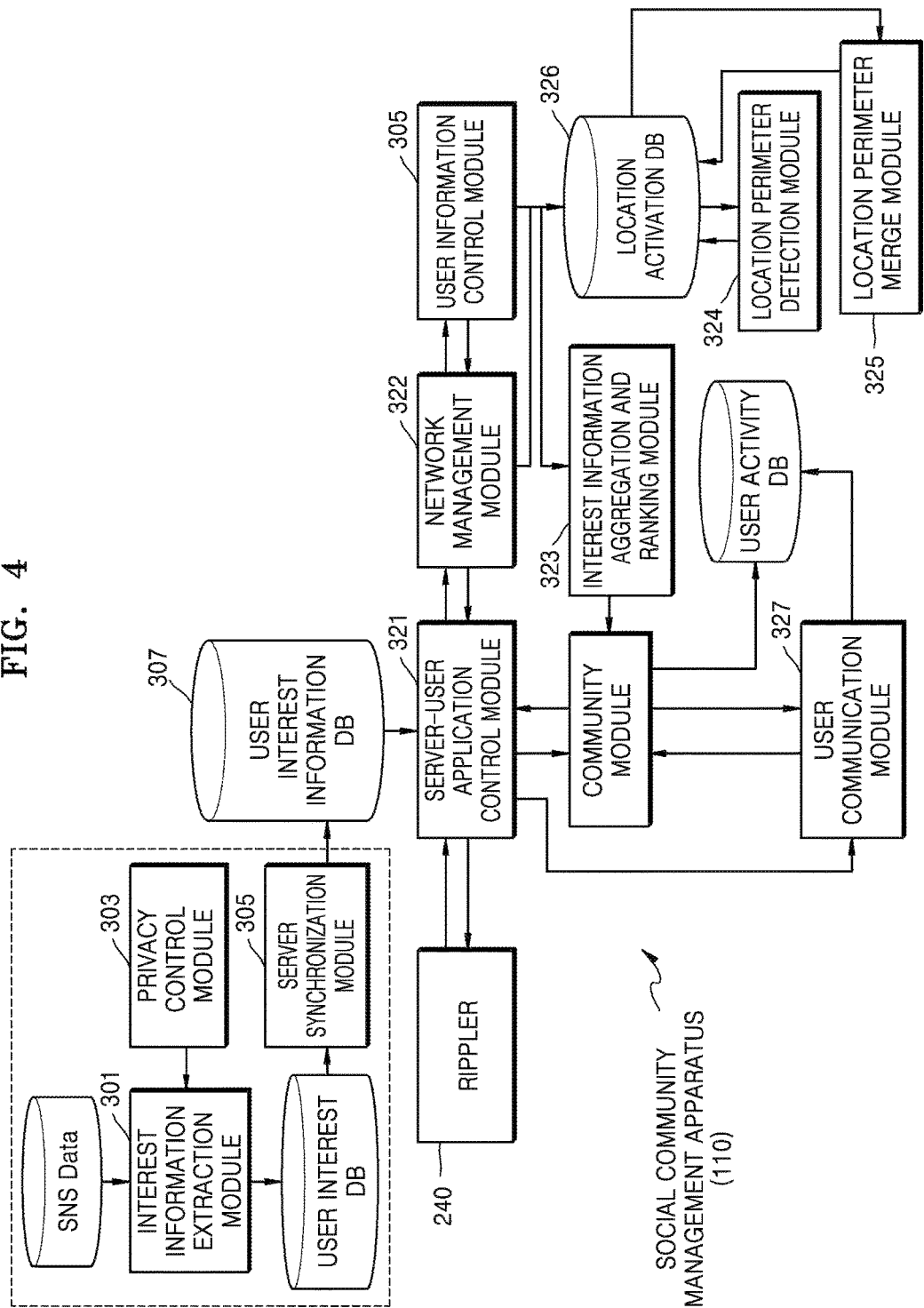
FIG. 4 is a block diagram of a rippler according to an exemplary embodiment.

FIG. 4 is a block diagram of the rippler 240 according to an exemplary embodiment.

The rippler 240 may include an interest information extraction module 301, a privacy control module 303, a server synchronization module 305, a user interest information database 307, a server-user application control module 321, a network management module 322, an interest information aggregation and ranking module 323, a location perimeter detection module 324, a location perimeter merge module 325, a location activation database 326, a user communication module 327, and a group module (not illustrated).

The interest information extraction module 301 may extract static interest information and dynamic interest information. The static interest information may be directly extracted from the information disclosed in user profile information. The dynamic interest information may be extracted by using a BiTerm based topic modeling (Xiaohui, Jiafeng, Yanyan, and Xueqi, 2013) from user's textual data (SMS, social posts, comments, or the like) existing in the SNS server. The interest information extraction module 301 may be controlled by the privacy control module 303 when the interest information is extracted from the data existing in the SNS server. The privacy control module 303 may limit the access to predetermined data so as to protect a user's privacy, based on user setting of the social network application.

The server synchronization module 305 may synchronize the updated user interest information and privacy setting with the online database existing in the server.

The server-user application control module 321 may search and discover users existing within a predetermined geo-fence 220 and keep communications of the users alive.

The network management module 322 may track user location whereabouts and manage network related problems of the rippler 240.

The interest information aggregation and ranking module 323 is configured to manage a set of interests to be displayed for group in a particular location along with sub-interests of the users.

The location perimeter detection module 324 may detect the location perimeter based on available user density information. However, all locations are not served, and only selective locations based on the user density may be served by the rippler system.

The location perimeter merge module 325 may merge the existing location perimeters when the user density falls below a threshold value.

The location activation database 326 may store information for activating the location of the user.

The user communication module 327 may manage communication aspects of the rippler system.

The group module (not illustrated) may manage volatile or non-volatile groups and may create, remove, edit, and monitor the groups.

Figure 5:
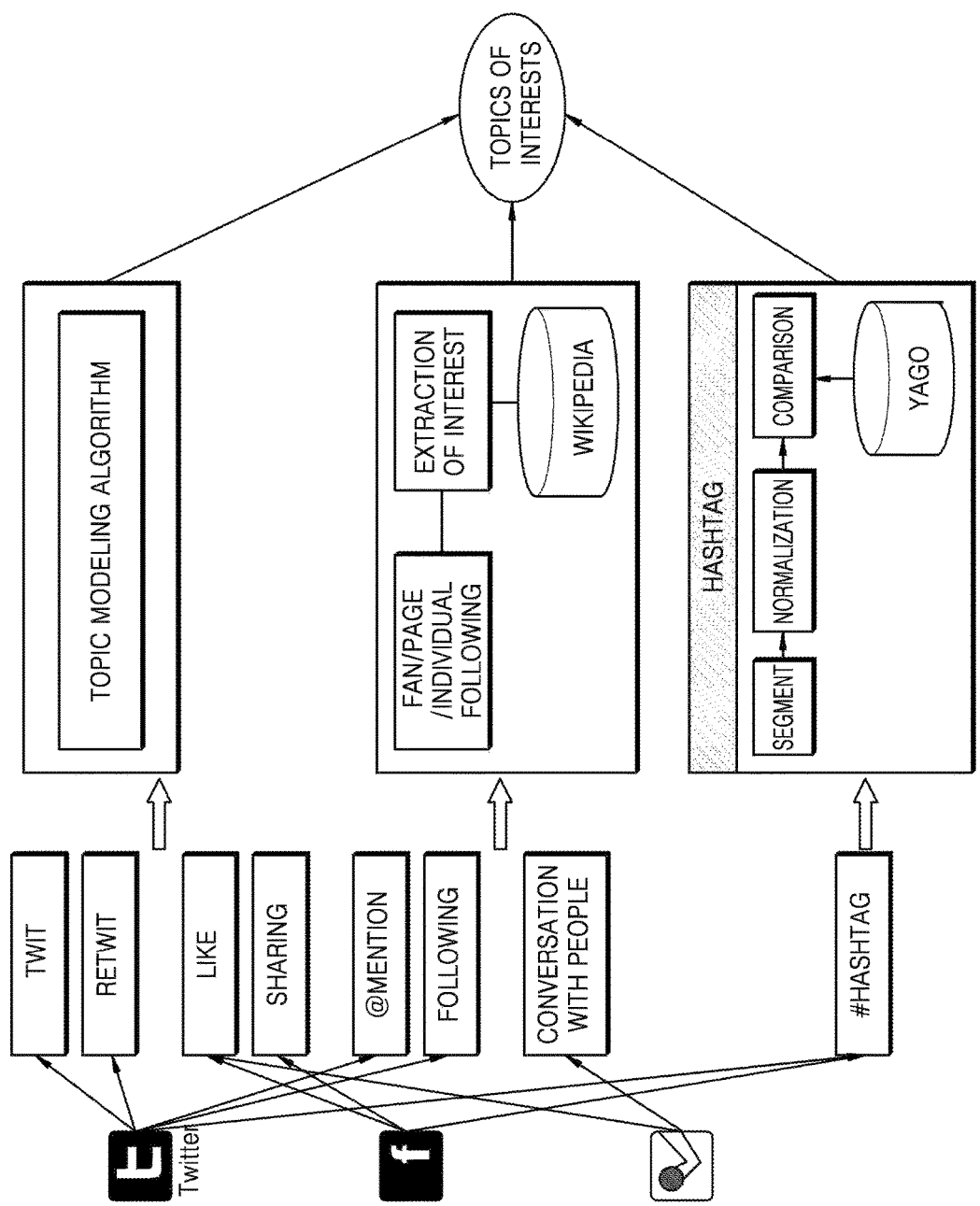
FIG. 5 is a schematic diagram for describing a method of gathering interest information from SNS server data and finding a topic from the gathered interest information, which is performed by a rippler.

FIG. 5 is a schematic diagram for describing a method of gathering interest information from SNS server data and finding a topic from the gathered interest information, which is performed by the rippler 240.

Specifically, FIG. 5 is a conceptual diagram of a method of extracting interest information of the users 230 and determining common interest information, which is performed by the rippler 240, according to an exemplary embodiment.

According to the exemplary embodiment, the controller 114 of the rippler 240 may extract interest information from a variety of multimedia content and extract common interest information by aggregating the extracted interest information.

Specifically, the communication interface 116 of the rippler 240 may gather interest information of the users 230 from the SNS server, and the controller 114 may determine common interest information based on the gathered information. The communication interface 116 may gather text data from the SNS server, and the controller 114 may extract a keyword representing interest information by applying a topic modeling to the gathered text data.

Numerous information on users is present in the module device such as a smartphone. The information on the users may include what the users do and when and where the users do that. Such numerous information may be generated by the users and the generated information may be extracted from the multimedia database.

Application programming interfaces (APIs) of the rippler 240 may collate data from various multimedia sources. The APIs may extract user interest information from data existing in the SNS server.

For example, the APIs may extract social data existing in a Facebook server and find out what the recent activities of the user are or what the user is interested in.

Using GPS data and inverse mapping of geo-coordinates, it is possible to find places the user has visited recently. Image related applications, such as Instagram, may be used to find things the user likes to click. Form twitter fan following, it is possible to infer about the user's recent likes and topics the user is interested in.

Therefore, numerous information sources for accurately profile user's activities and interests may be present in the SNS server or the mobile device. Details of the activity and interest information may be gathered from the user's text data by using topic models and other text dependent techniques suitable for a social network platform. The topics generated by the topic models may be keywords representing the user interest information such as cars, cameras, and hip-hop.

Topic models, such as Latent Dirichlet Allocation (LDA), is an analysis method of modeling topics associated with each document. The models, such as the LDA, are a method of generating a model using a statistical method with respect to data given as a model for finding topics from a set of documents and solving a desired problem by applying an already generated model to new data. However, since social media postings of the social network application are generally short and do not span more than 10 words, the topic models, such as the LDA, may not be suitable for modeling topics present in social media postings.

In particular, the LDA, which is the analysis method based on a word co-occurrence pattern at a document level, may not be suitable for these constraint. An approach, such as a Bi-term topic model based on word co-occurrence at a corpus level, may be employed to circumvent this problem.

In addition, other heuristic based approaches, such as "celebrity following" or "hashtag deciphering", may be used to find interest information of users.

The rippler 240 may confirm that a first user presses "like" in a car related article on the Facebook and may gather car related article as text data from the Facebook server. In addition, the rippler 240 may confirm that a second user posts a motor show photograph on the Instagram and may gather a hashtag "#car, #motor show" with respect to the posts as text data from the Facebook server. In addition, the rippler 240 may update "this car is nice" in a comment of a twitter by a third user, or may check an updated status message, such as "I am trying to change a car", and gather text data from a twitter server.

The text data gathered from the SNS server may be stored in the database of the storage 112 together with the mobile device ID and the user ID, and the controller 114 may determine the common interest information from the database. The controller 114 may search for information from the database by using the mobile device ID or the user ID and find a common keyword through comparison of keywords.

The listing of the social community sharing the interest information may be displayed as travel (3), movie (5), and sports (3). The number in the bracket represent the number of active users in each social community. Each of the users may be anonymized. The users may communicate and do activities together like playing games or sharing pictures.

Figure 6:
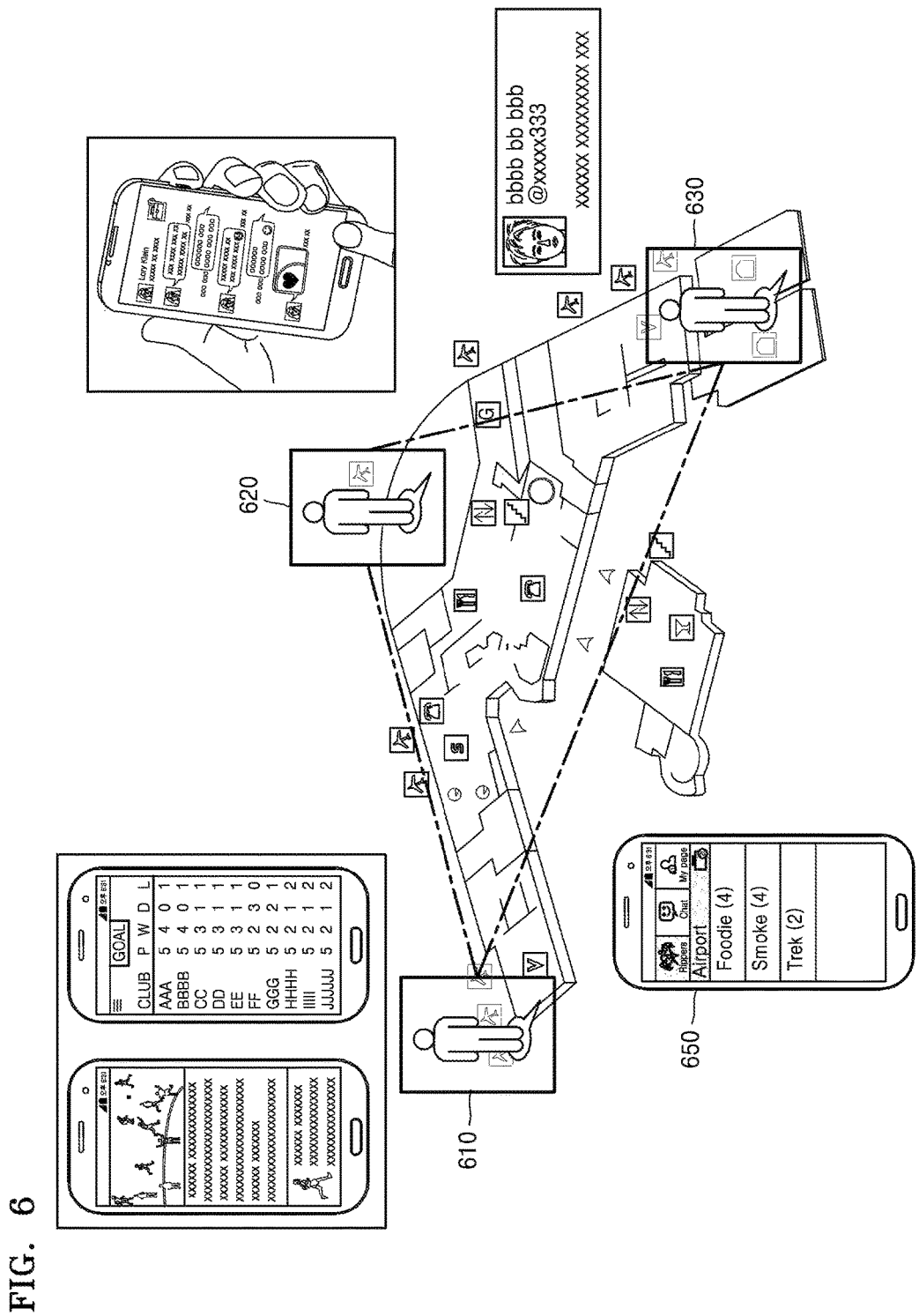
FIG. 6 is a conceptual diagram for describing a process of creating a social community, which is performed by a rippler, according to an exemplary embodiment.

FIG. 6 is a conceptual diagram for describing a process of creating a social community, which is performed by the rippler 240, according to an exemplary embodiment.

Specifically, FIG. 6 illustrates users 610, 620, and 630 located at an airport. The user 610 reads a football related article on the website using mobile device of the user 610 at a check-in counter in the airport. The user 620 talks with his/her friend about a score of a football game at a food court in the airport through a Chaton application using mobile device of the user 620. The user 630 updates his/her own status about the football to a twitter using mobile device of the user 630 at a lounge in the airport.

The social community management apparatus 110 may gather things the users 610, 620, and 630 read and transmitted/received messages and determine the football, which is the common interest information of the users 610, 620, and 630, from the gathered messages, sentences, and words by applying topic modeling.

That is, the rippler 240 may directly gather data from the mobile devices of the users 610, 620, and 630, instead of the SNS server. The rippler 240 may create a social community 650 focusing on the football.

Although not illustrated, the rippler 240 may gather interest information of some users within the group 100 from the SNS server and directly gather interest information of some users from the mobile devices.

Figure 7:
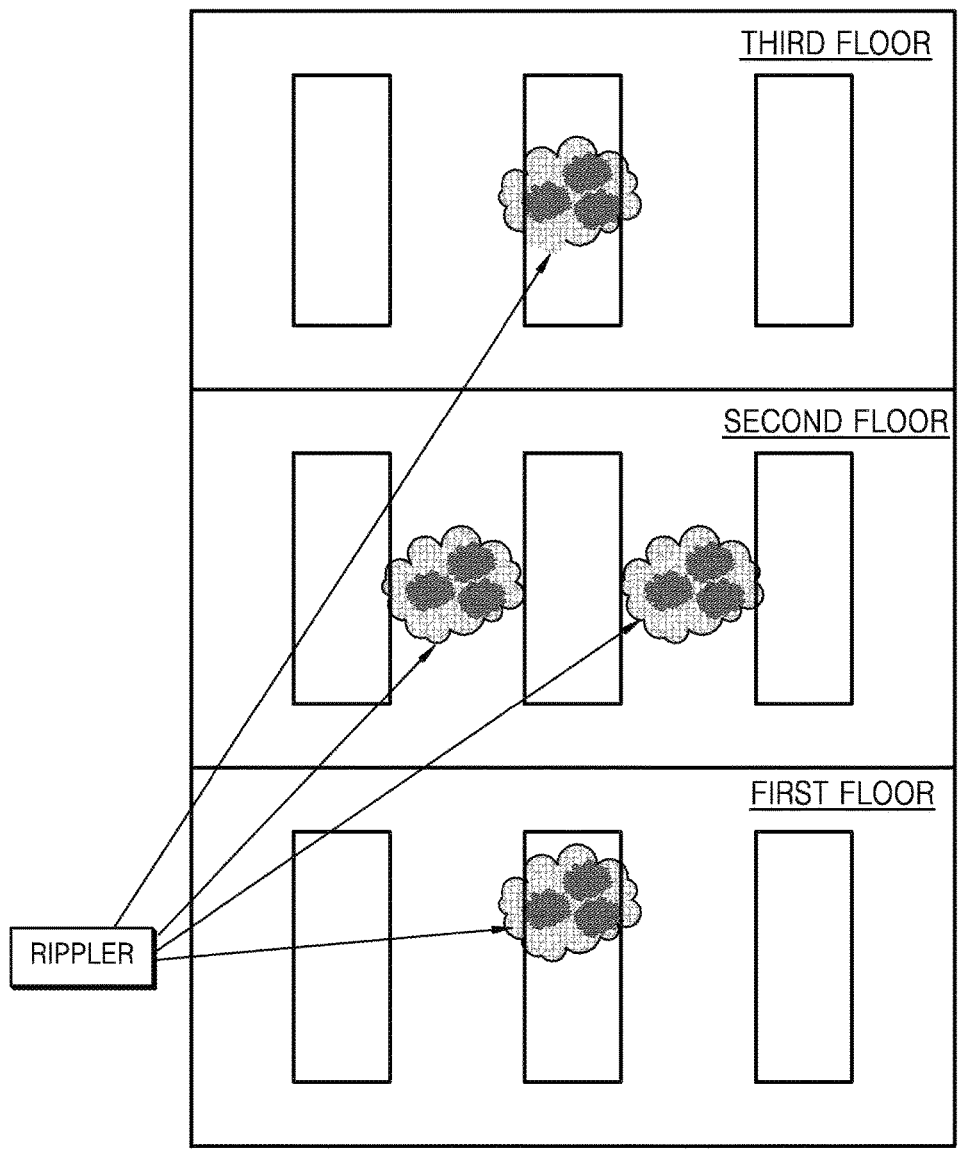
FIG. 7 is a diagram illustrating locations where a rippler is activated, according to an exemplary embodiment.

FIG. 7 is a diagram illustrating locations where the rippler 240 is activated, according to an exemplary embodiment.

The rippler 240 is not usable at all locations. That is, polling of the rippler 240 may not be usable at all locations. As illustrated in FIG. 7, some activated locations, such as a mall, a cafe, or an airport, may be activated for creating the social communities.

Figure 8:
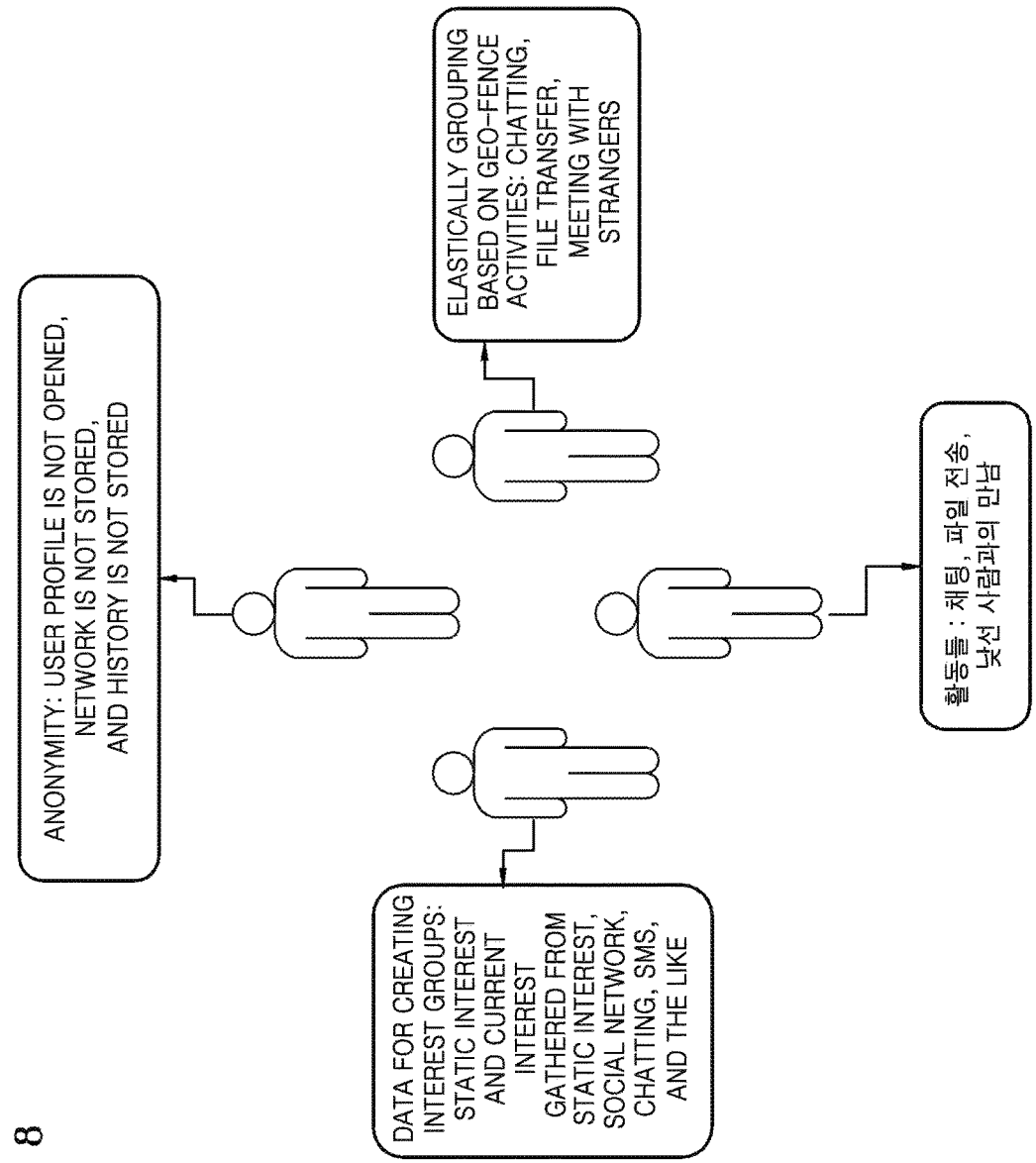
FIG. 8 is a diagram for describing features of a rippler, according to an exemplary embodiment.

FIG. 8 is a diagram for describing features of the rippler 240, according to an exemplary embodiment.

Figure 9:
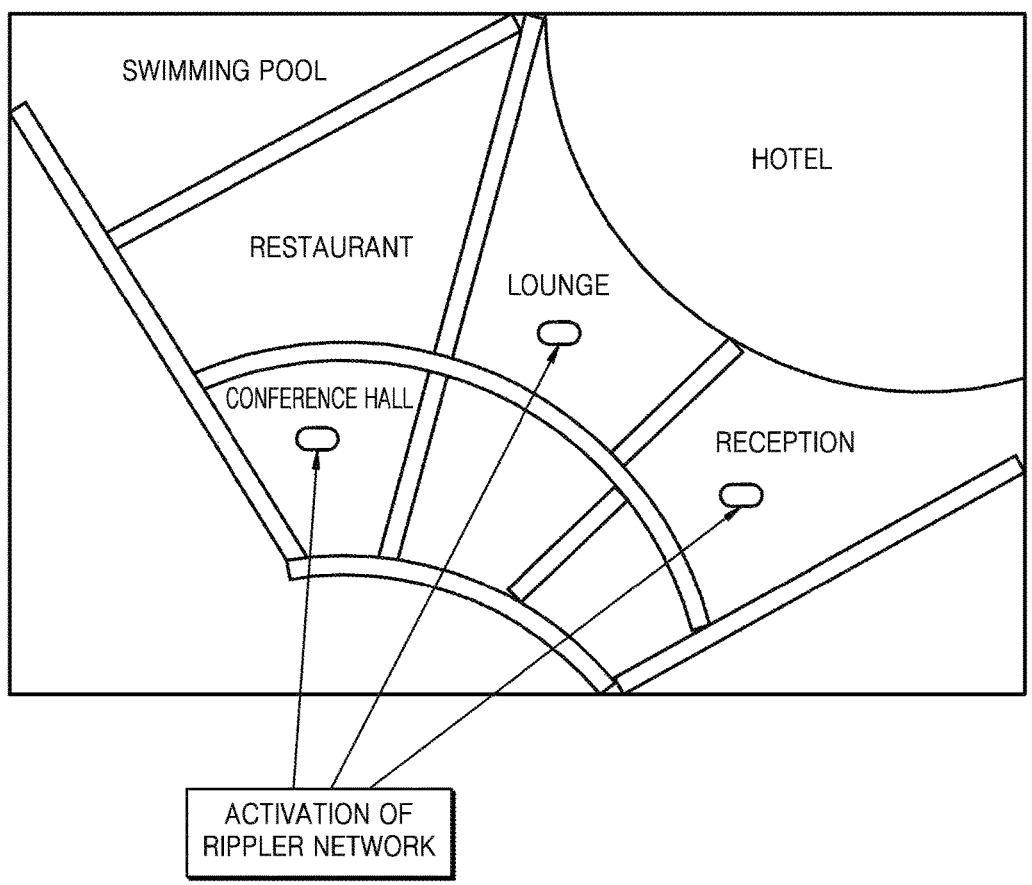
FIG. 9 is a plan view of a resort according to an exemplary embodiment.

FIG. 9 is a plan view of a resort according to an exemplary embodiment.

Locations indicated by circles represent examples of locations where the rippler 240 is usable. The resort may provide the existing users of the rippler 240 with a free download or free Wi-Fi connection of a customized version of the rippler 240 that is usable only at that location.

Figure 10:
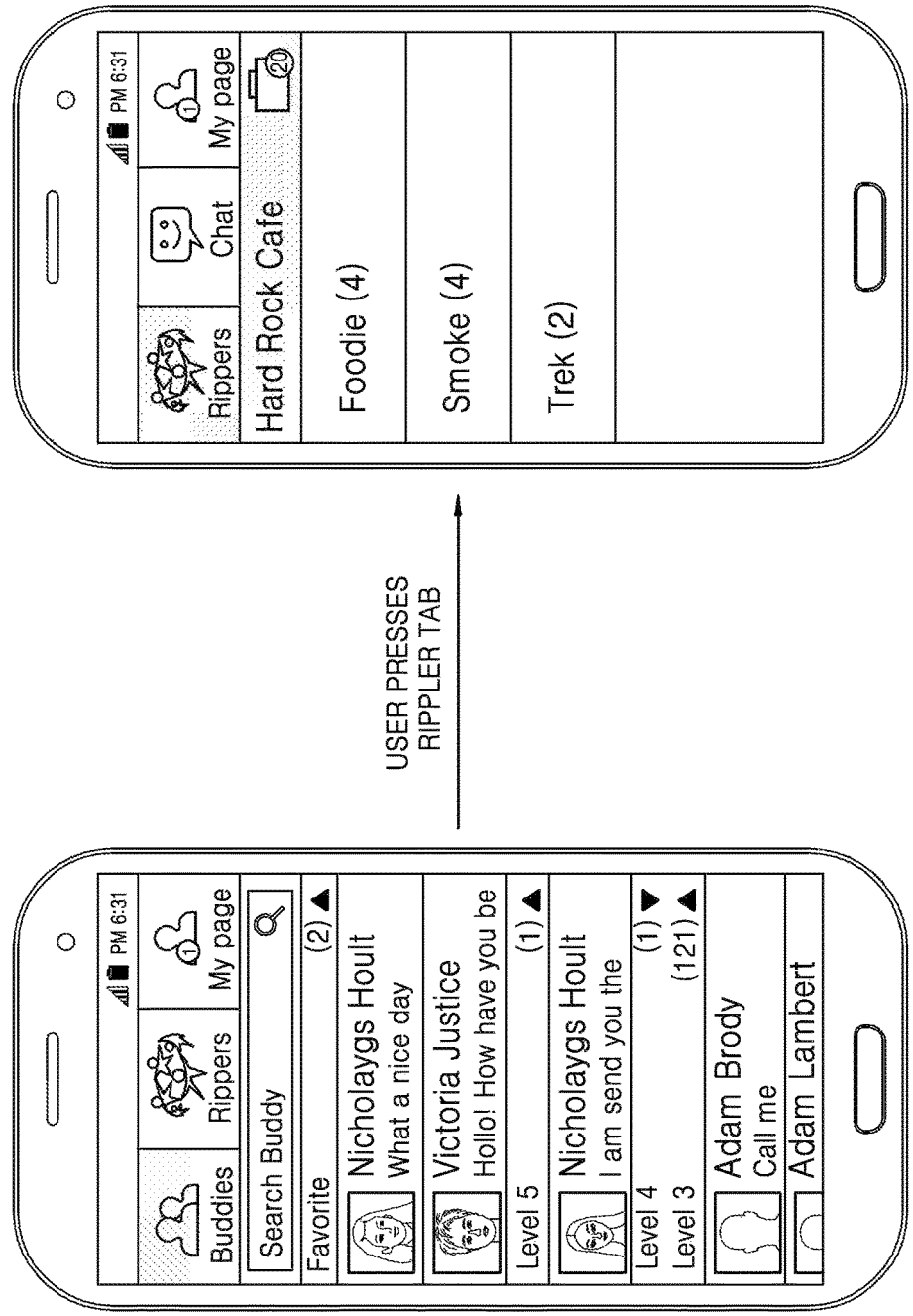
FIG. 10 is a diagram of a scenario on which a rippler mode is executed, according to an exemplary embodiment.

FIG. 10 is a diagram of a scenario on which a rippler mode is executed, according to an exemplary embodiment.

According to the exemplary embodiment, the rippler 240 may be executed on a third chatting application or an existing social network application so as to improve user experience. This may be referred to as a "rippler mode". For example, when the user selects a rippler mode by pressing a rippler tab, it is possible to view a list of social communities created around the user. In the ripper mode, the users may be anonymized.

Figure 11A:
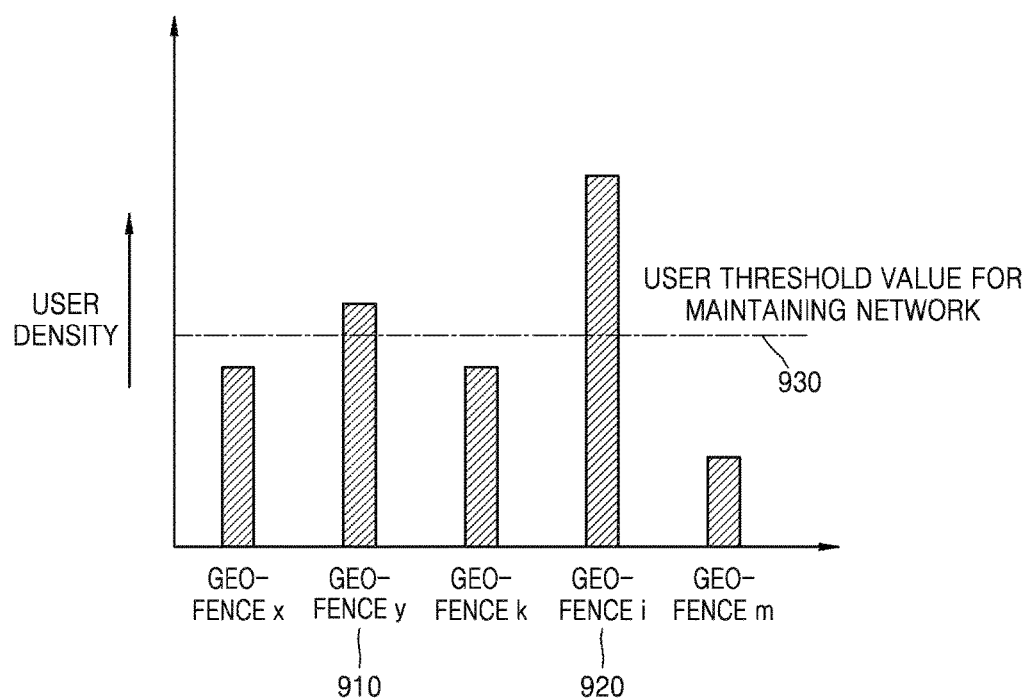
FIG. 11A is a graph of a user number for each geo-fence area, according to an exemplary embodiment.

FIG. 11A is a graph of a user number for each geo-fence area, according to an exemplary embodiment.

When the geo-fence perimeter is set, the rippler 240 may establish a network for social community management. As described above, the interest network may be established only when the user density inside the geo-fence is equal to or greater than a threshold value 930. Therefore, the interest network may be established only at a geo-fence y 910 and a geo-fence i 920 in which the density of the users 230 is equal to or greater than the threshold value 930.

Figure 11B:
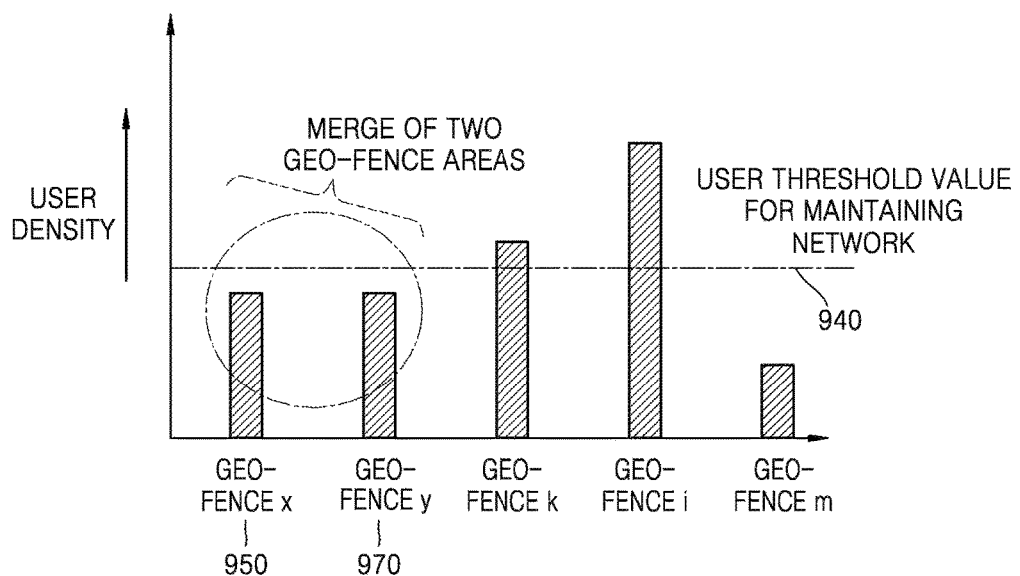
FIG. 11B is a graph for describing a process of merging two adjacent geo-fences, according to an exemplary embodiment.

FIG. 11B is a graph for describing a process of merging two adjacent geo-fences, according to an exemplary embodiment.

When the adjacent geo-fence areas exist, the merge of the geo-fences may be performed. Although the respective geo-fences have the user density equal to or greater than a threshold value 940, the geo-fences may satisfy the threshold value 940 preset to the system by merging a plurality of adjacent geo-fence areas. Although the geo-fence x 950 and the geo-fence y 970 do not satisfy the minimum number 940 of users at which the respective networks can be maintained, a new geo-fence obtained by merging the geo-fence X 950 and the geo-fence Y 970 may exceed the minimum number 940 of the users and maintain the interest network.

That is, before removing a social community A existing in a geo-fence whose user density is less than the threshold value, the controller 114 of the rippler 240 may merge another geo-fence existing within a predetermined distance and maintain the social community A when the user density of the merged geo-fence is greater than the threshold value.

Figure 12:
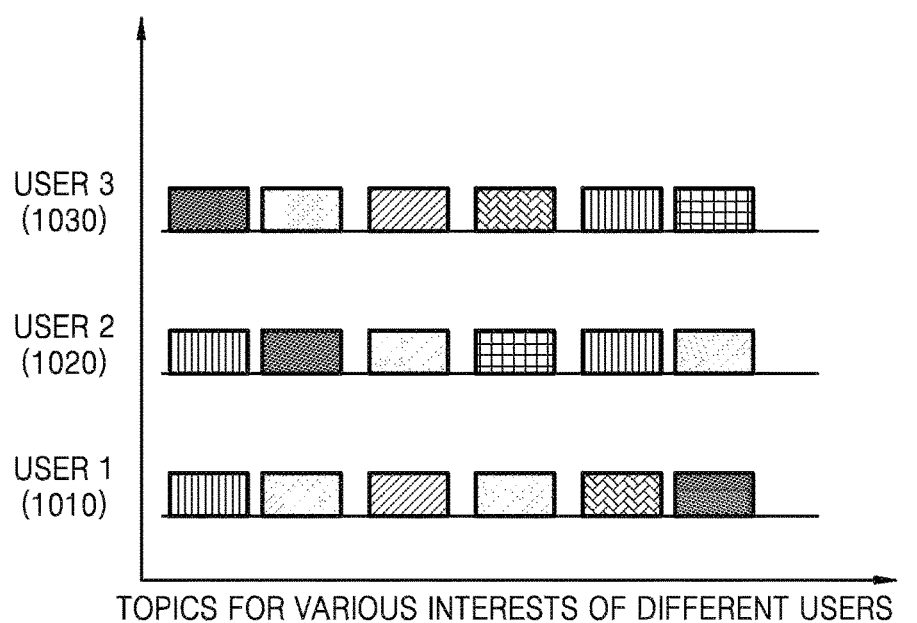
FIG. 12 is a graph for describing a process of selecting a topic of interest information of users within a specific geo-fence.

FIG. 12 is a graph for describing a process of selecting a topic of interest information of users existing within a specific geo-fence.

The rippler 240 may use interest information vectors extracted from the users existing within the geo-fence perimeter so as to create social communities sharing interest information.

In order to select topics about interest information on the specific geo-fence, a context about the topics of the interest information may be indexed from all users belonging to the same location perimeter. Subsequently, the cumulative context vector may be created by taking Euclidian distance of individual user's context vector. Subsequently, the context indices may be ranked based on the generated cumulative score. Subsequently, a plurality of context indices may be selected until all the users existing within the geo-fence have at least one topic of interest.

The selected contexts may be reversely mapped to the topics and be shown to users 230 in the geo-fence 220. The perimeter of the geo-fence 220 may be continuously observed so as to check whether the user 230 is inside the geo-fence 220 or the user 230 deviates from the geo-fence 220. If the user 230 deviates from the geo-fence 220, the interest vector for the geo-fence 220 may be updated. After that, the interest vector of the user 230 who deviates from the geo-fence 220 may be deleted.

Figure 13:
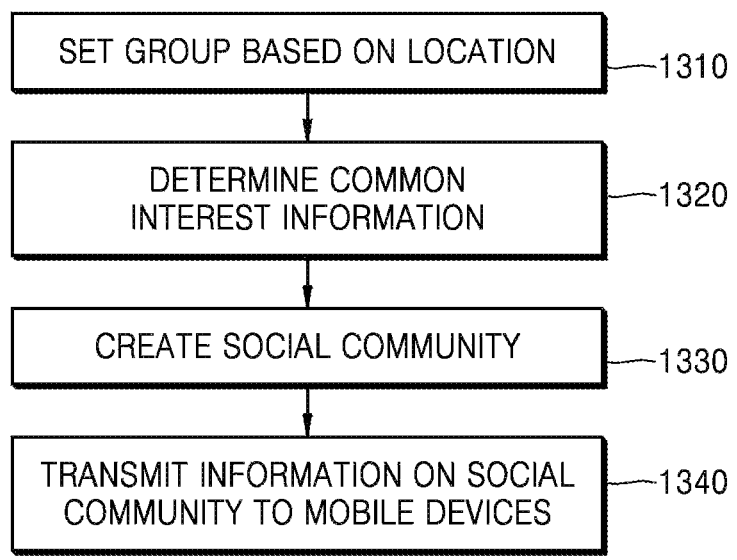
FIG. 13 is a flowchart of a social community management method, which is performed by a rippler, according to another exemplary embodiment.

FIG. 13 is a flowchart of a social community management method, which is performed by the rippler 240, according to another exemplary embodiment. FIG. 13 is a flowchart of a social community management method, which is performed by the rippler 240 illustrated in FIG. 2. Thus, the descriptions provided with reference to FIGS. 1 and 2 may also be applied to the social community management method of FIG. 13.

In operation 131, the rippler 240 may set a group including a plurality of mobile devices, based on a location.

In operation 1320, the rippler 240 may determine common interest information shared by users of the plurality of mobile devices included in the set group.

In operation 1330, the rippler 240 may generate a social community for communications of the users, based on the determined common interest information.

In operation 1340, the rippler 240 may transmit information on the generated social community to the plurality of mobile devices.

Figure 14A:
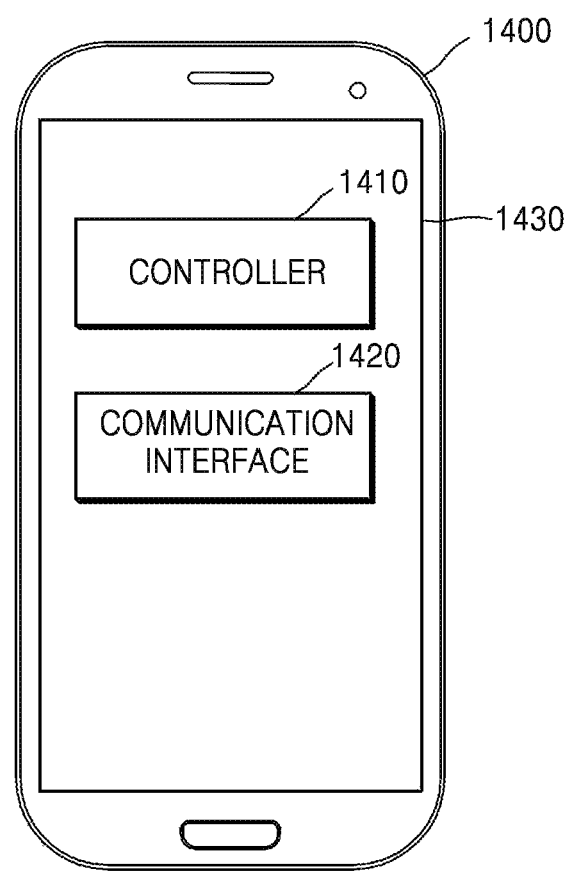
FIG. 14A is a schematic diagram of a mobile device on which a rippler is executed, according to an exemplary embodiment.

FIG. 14A is a schematic diagram of a mobile device 1400 on which a rippler is executed, according to an exemplary embodiment. A user may use a social community by using the mobile device 1400.

The mobile device 1400 of FIG. 14A is a specific embodiment of the mobile devices 101, 102, 103, 104, 105, 106, and 107 of FIG. 1 and the mobile device 235 of FIG. 2. Therefore, the descriptions provided with reference to FIGS. 1 and 2 may also be applied to the mobile device 1400 of FIG. 14A.

The mobile device 1400 may include a display 1430, a controller 1410, and a communication interface 1420.

The display 1430 displays information processed in the mobile device 1400. The display 1430 may include a liquid crystal display (LCD), a thin-film transistor-liquid crystal display (TFT-LCD), an organic light-emitting diode (OLED), a flexible display, a three-dimensional (3D) display, or an electrophoretic display, but is not limited thereto.

The controller 1410 may be an application specific integrated circuit (ASIC), an embedded processor, a microprocessor, a hardware control logic, a hardware finite state machine (FSM), a digital signal processor (DSP), or any combinations thereof.

The communication interface 1420 may enable communication with the outside. The communication interface 1420 may access an external server or source and transmit and receive necessary data and may access the outside via various communication paths. The communication paths may represent various networks and network topologies. For example, the communication paths may include wireless communication, wired communication, optics, ultrasonic waves, or any combinations thereof. Examples of the wireless communication may include satellite communication, mobile communication, Bluetooth, infrared data association standard (IrDA), wireless fidelity (WiFi), and worldwide interoperability for microwave access (WiMAX). Examples of the wired communication may include Ethernet, digital subscriber line (DSL), fiber to the home (FTTH), and plain old telephone service (POTS). In addition, the communication paths may include personal area network (PAN), local area network (LAN), metropolitan area network (MAN), wide area network (WAN), or any combinations thereof.

The communication interface 1420 may transmit location information of the mobile device 1400 to a server and receive information on the social community from the server. The location information may include any one of physical geographical locations such as GPS data, information regarding whether the mobile device 1400 is connected to a specific AP, and information regarding whether the mobile device 1400 is located within a specific hotspot.

The display 1430 may display the information on the received social community on the mobile device 1400. The social community means online space created based on common interest information of the users within the geofence.

The controller 1410 may communicate with at least one of other mobile devices within the geo-fence by using the information on the received social community. That is, the mobile device 1400 may perform chatting, file sharing, photograph sharing, and games with other mobile devices.

Figure 14B:
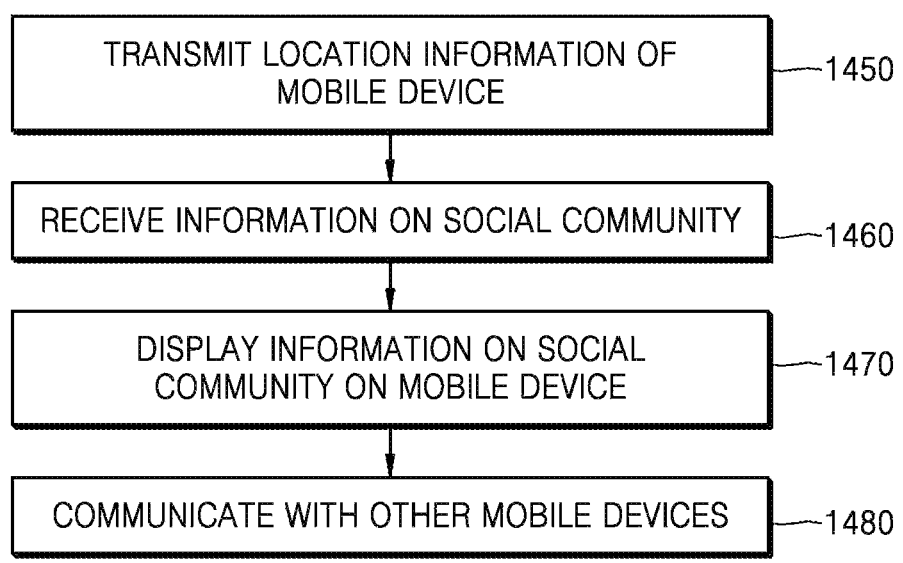
FIG. 14B is a flowchart of a social community management method, which is performed by a mobile device, according to an exemplary embodiment.

FIG. 14B is a flowchart of a social community management method, which is performed by a mobile device 1400, according to another exemplary embodiment. Since FIG. 14B is a flowchart of a method by which the mobile device 1400 of FIG. 14A uses the social community, the descriptions provided with reference to FIG. 14A may also be applied to the social community management method of FIG. 14B.

In operation 1450, the mobile device 1400 may transmit location information of the mobile device 1400 to a server.

In operation 1460, the mobile device 1400 may receive information on the social community created based on common interest information shared by the user of the mobile device 1400 and users of a plurality of mobile devices including other mobile devices within a geo-fence set based on the transmitted location information.

In operation 1470, the mobile device 1400 may display the information on the social community on the mobile device 1400.

In operation 1480, the mobile device 1400 may communicate with other mobile devices by using the received information on the social community.

While the inventive concept has been particularly shown and described with reference to exemplary embodiments thereof, it will be obvious to those of ordinary skill in the art that various substitutes, changes, and modifications in form and details may be made therein without departing from the spirit and scope of the inventive concept as defined by the following claims. Thus, all details described in the present specification with reference to the exemplary embodiments and drawings should be interpreted as being exemplary and non-limiting.

The device described herein may include a processor, a memory for storing program data and executing it, a permanent storage such as a disk drive, a communications port for handling communications with external devices, and user interface devices, including a display, keys, etc.

When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the inventive concept could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A social community management method comprising:
setting, at a server, two or more geographical areas associated with locations of mobile devices;
setting, at the server, a group including a plurality of mobile devices, by merging at least two adjacent geographical areas based on device density within each of the two or more geographical areas;
determining, at the server, common interest information common to users of the plurality of mobile devices included in the group;
creating, at the server, a social community for communication of the users of the plurality of mobile devices included in the group based on the determined common interest information; and
transmitting, from the server, information on the created social community to the plurality of mobile devices.

2. The social community management method of claim 1, wherein the merged at least two adjacent geographical areas are virtual areas where the plurality of mobile devices subjected to the creation of the social community are included.

3. The social community management method of claim 1, wherein geographical areas comprise wireless LAN service areas, and each of the at least two adjacent wireless LAN service areas has device density equal to or less than a threshold value.

4. The social community management method of claim 1, wherein the determining of the common interest information comprises:
gathering interest information of the users of the plurality of mobile devices included in the group from a social network service (SNS) server or at least one of the plurality of mobile devices; and
determining the common interest information based on the gathered information.

5. The social community management method of claim 4, wherein the gathering of the interest information comprises:
gathering text data from the SNS server or at least one of the plurality of mobile devices, and
extracting keywords representing the interest information by applying topic modeling to the gathered text data, and
wherein the determining of the common interest information comprises finding a common keyword by comparing the extracted keywords.

6. The social community management method of claim 1, wherein the generating of the social community comprises generating online space where the users of the plurality of mobile devices included in the group chat with one another or share files with one another.

7. The social community management method of claim 1, further comprising removing, at the server, the created social community when device density of the plurality of mobile devices within the merged at least two adjacent geographical areas is equal to or less than a threshold value.

8. The social community management method of claim 1, further comprising, when any one of the plurality of mobile devices deviates from the merged at least two adjacent geographical areas, transmitting the information on the created social community to the plurality of mobile devices other than the mobile device that deviates from the merged at least two adjacent geographical areas.

9. A social community management apparatus comprising:
a storage configured to store data about a group including a plurality of mobile devices;
at least one processor configured to:
set two or more geographical areas associated with locations of mobile devices,
set the group by merging at least two adjacent geographical areas based on device density within each of the two or more geographical areas,
determine common interest information common to users of the plurality of mobile devices located within the set group, and
create a social community for communication of the users of the plurality of mobile devices included in the group based on the determined common interest information; and
a communication interface configured to transmit, from the social community management apparatus, information on the created social community to the plurality of mobile devices.

10. The social community management apparatus of claim 9,
wherein the merged at least two adjacent geographical areas are virtual areas where the plurality of mobile devices subjected to the creation of the social community are included.

11. The social community management apparatus of claim 10, wherein the geographical areas comprise wireless LAN service areas, and each of the at least two adjacent wireless LAN service areas has device density equal to or less than a threshold.

12. The social community management apparatus of claim 9,
    wherein the communication interface is further configured to gather interest information of the users of the plurality of mobile devices included in the group from a social network service (SNS) server or at least one of the plurality of mobile devices; and
    wherein the at least one processor is further configured to determine the common interest information based on the gathered information.

13. The social community management apparatus of claim 12,
    wherein the communication interface is further configured to gather text data from the SNS server or at least one of the plurality of mobile devices, and
    wherein the at least one processor is further configured to:
        extract keywords representing the interest information by applying topic modeling to the gathered text data, and
        find a common keyword by comparing the extracted keywords.

14. The social community management apparatus of claim 9, wherein the at least one processor is further configured to generate online space where the users of the plurality of mobile devices included in the group chat with one another or share files with one another.

15. The social community management apparatus of claim 9, wherein the at least one processor is further configured to remove the created social community when device density of the plurality of mobile devices within the merged at least two adjacent geographical areas is equal to or less than a threshold value.

16. The social community management apparatus of claim 9, wherein, when any one of the plurality of mobile devices deviates from the merged at least two adjacent geographical areas, the at least one processor is further configured to transmit the information on the created social community to the plurality of mobile devices other than the mobile device that deviates from the geographical area.

17. A method of using a social community, the method comprising:
    transmitting location information of a first mobile device to a server;
    receiving from the server information on a social community created based on common interest information common to a user of the first mobile device and users of a plurality of mobile devices within at least two adjacent geographical areas which are merged based on device density within each of two or more geographical areas associated with locations of mobile devices;
    displaying information on the social community on the first mobile device; and
    communicating with a second mobile device of the plurality of mobile devices by using the received information on the social community.

18. A device comprising:
    a communication interface configured to:
        transmit location information of a first mobile device to a server, and
        receive information on a social community from the server;
    a display configured to display the information on the social community on the first mobile device; and
    at least one processor,
    wherein the social community is created based on common interest information common to a user of the first mobile device and users of a plurality of mobile devices within at least two adjacent geographical areas which are merged based on device density within each of two or more geographical areas associated with locations of mobile devices, and
    wherein the at least one processor is further configured to control the communication interface to communicate with a second mobile device of the plurality of mobile devices by using the received information on the social community.

19. A non-transitory computer-readable recording medium having embodied thereon a program for executing the method of claim 1.

20. A non-transitory computer-readable recording medium having embodied thereon a program for executing the method of claim 17.

* * * * *